United States Patent [19]
Hawes

[11] Patent Number: 5,957,795
[45] Date of Patent: Sep. 28, 1999

[54] ACCESSORY DRIVE BELT TENSIONER FOR AUTOMOTIVE ENGINE

[75] Inventor: David James Hawes, Brentwood, United Kingdom

[73] Assignee: Ford Global Technologies, Inc., Dearborn, Mich.

[21] Appl. No.: 08/887,919

[22] Filed: Jul. 3, 1997

[30] Foreign Application Priority Data

Jul. 3, 1996 [GB] United Kingdom ................... 9613937

[51] Int. Cl.[6] ..................................................... F16H 7/22
[52] U.S. Cl. ........................................... 474/112; 474/101
[58] Field of Search ................................... 474/101, 112, 474/133, 134, 135

[56] References Cited

U.S. PATENT DOCUMENTS

| | | |
|---|---|---|
| 4,443,210 | 4/1984 | Olschewski et al. ............... 474/112 X |
| 4,525,151 | 6/1985 | Tomita et al. ........................... 474/101 |
| 4,722,720 | 2/1988 | Ojima et al. ............................. 474/101 |
| 4,743,224 | 5/1988 | Yoshikawa et al. ..................... 474/101 |
| 4,997,409 | 3/1991 | Sonoda et al. ........................... 474/101 |
| 5,078,655 | 1/1992 | Brandenstein et al. ................. 474/102 |
| 5,399,124 | 3/1995 | Yamamoto et al. ................ 474/112 X |

FOREIGN PATENT DOCUMENTS

| | | |
|---|---|---|
| 3908817 C1 | 5/1990 | Germany . |
| 2199917 | 7/1988 | United Kingdom . |

*Primary Examiner*—Thomas R. Hannon
*Attorney, Agent, or Firm*—Jerome R. Drouillard

[57] ABSTRACT

A belt drive arrangement has a drive belt 14 which passes around and transfers rotation between a plurality of ratable members (pulleys) 16, 26, 20, 22, 24. The drive belt path includes both a belt tensioner 18 and an idler pulley 22. The idler pulley has a rotation axis and is mounted to a fixed structure on a mounting axis 36 which is eccentric to the rotation axis. The idler pulley is provided with a lever 40 by which it can be rotated about the mounting axis to vary the position of the surface of the idler pulley which is in contact with the belt relative to the mounting axis, and thus to vary the tension in the belt.

1 Claim, 2 Drawing Sheets

5,957,795

ACCESSORY DRIVE BELT TENSIONER FOR AUTOMOTIVE ENGINE

TECHNICAL FIELD

This invention relates to a method for setting the tension in a drive belt, and also to an arrangement for tensioning a drive belt. The invention is particularly applicable to drive belts in automotive internal combustion engines.

DISCLOSURE INFORMATION

The term 'drive belt', when used in this specification, includes such flexible, inextensible power transmitting members as flexible rubber or rubber-like belts, whether flat, toothed or V-form, and chains with metal links.

In a motor vehicle engine, a number of auxiliary devices are driven by the engine's crankshaft. Such auxiliary devices may include the camshaft or camshafts, a water pump, an oil pump, an alternator, balance shafts and the like. The rotation of the crankshaft is generally transferred to these auxiliary devices by one or more belts which pass around a wheel on the crankshaft axis and then around a wheel on the drive shaft of the auxiliary device to be driven.

In the case of the camshaft or camshafts, it is of very great importance that the camshaft rotation be synchronized with that of the crankshaft to achieve the correct engine timing. A toothed belt is normally used for this purpose. It is necessary to maintain the correct tension in this belt, both to ensure maintenance of the correct timing and to ensure a long life for the belt.

Various arrangements are known for setting this tension, and it is conventional to include in the belt run an auto tensioner device which is spring loaded and which ensures that the belt is placed under a constant tension, irrespective of expansion and contraction of the belt itself and of the other engine components which can affect belt tension.

When the belt is first installed, or when the belt is replaced in service, it is necessary to initially set the belt tension so that the auto tensioner is at the center of its available travel so that the auto tensioner can thereafter make use of its full range of movement to maintain the correct belt tension.

SUMMARY OF THE INVENTION

According to the present invention, there is provided a belt drive arrangement in which a drive belt passes around and transfers rotation between a plurality of rotatable members (pulleys), wherein the drive belt path includes both a belt tensioner and an idler pulley, wherein the idler pulley has a rotation axis and is mounted to a fixed structure on a mounting axis which is eccentric to the rotation axis, the idler pulley being provided with means by which it can be rotated about the mounting axis to vary the position of the surface of the idler pulley which is in contact with the belt relative to the mounting axis, so as to vary the tension in the belt.

By arranging an idler pulley in the belt path in this way, it is possible to rotate the pulley, on engine set up, to place the belt tensioner in the correct initial setting position so that the belt tensioner can thereafter react to factors tending to produce subsequent increases or decreases in the belt's tension.

The idler pulley preferably comprises a hub with a freely rotating sleeve mounted on the hub, the sleeve providing the surface with which the drive belt will engage. The hub is formed with a mounting axis which is eccentric to the rotation axis of the pulley. The hub also preferably carries means for rotating the hub.

In a preferred form the hub has an eccentric aperture for a fastening bolt, the fastening bolt being intended to pass through the aperture and into a tapped hole in a fixed structure, for example an engine block or engine cylinder head. The hub also has a feature thereon which can be engaged by a tool to rotate the hub before the fixing bolt is tightened to secure the hub in that position. This feature may be a lever permanently connected to the hub, or it may be an hexagonal head on the hub or it may be a pair of opposed flats, any of which can be engaged by a tool or one of a variety of other arrangements which allows the hub to be rotated under control.

The invention also provides a method of setting the tension in a drive belt forming part of a belt drive arrangement which includes a belt tensioner and an idler pulley, the method comprising the steps of mounting the idler pulley to a fixed structure on a mounting axis which is eccentric to the rotation axis of the idler pulley, with the pulley lying in the belt path, releasing the mounting between the idler pulley and the fixed structure, and then rotating the idler pulley about the mounting axis until the tension in the belt tensioner is at a desired level, and then securing the mounting pulley in that position.

BRIEF DESCRIPTION OF THE DRAWINGS

The invention will now be further described, by way of example, with reference to the accompanying drawings in which.

DETAILED DESCRIPTION OF PREFERRED EMBODIMENTS

Figure 1:
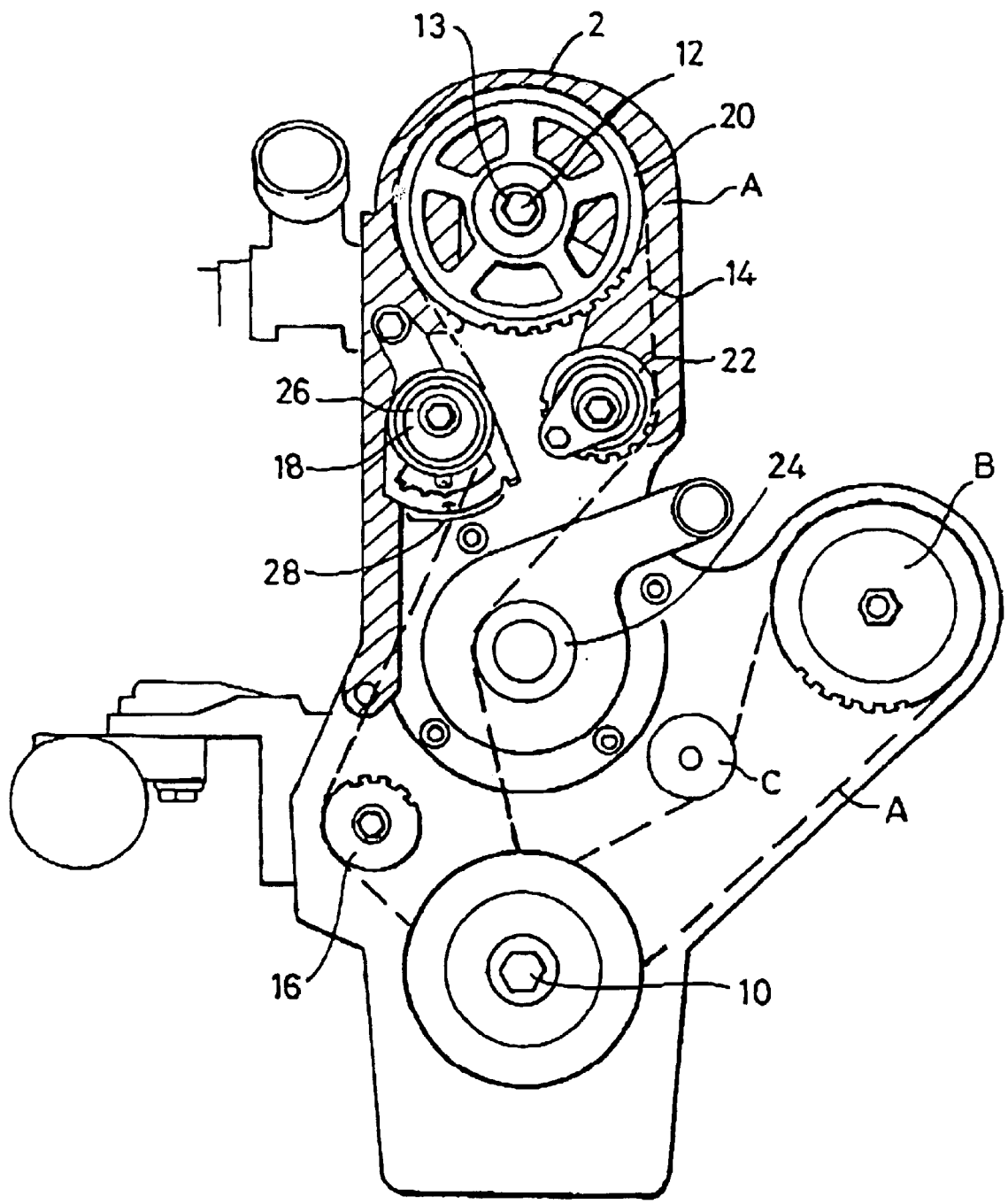
FIG. 1 is a schematic view of the end face of a motor vehicle engine which incorporates an arrangement in accordance with the invention.

FIG. 1 shows an end view of an internal combustion engine which has an engine block 2, a crankshaft 10, a camshaft 12 and a drive belt 14 connecting the shafts 10 and 12. Belt 14 passes around a first idler pulley 16, a belt auto tensioner 18, a toothed pulley 20 on camshaft 12, an adjustable idler pulley 22 and a water pump pulley 24. FIG. 1 also shows an auxiliary belt drive A extending around pulleys B and C, but this forms no part of the present invention.

When crankshaft 10 rotates (which it does when he engine is running) belt 14 is driven to produce otation of camshaft pulley 20 and thus of camshaft 12 together with rotation of water pump pulley 24 which operates the water pump. As is conventional, the inside face of belt 14 will be formed with teeth, whereas the outside run will be flat. The teeth are required to ensure that the rotation of camshaft 12 is synchronized with that of crankshaft 10, but no such synchronization is required for water pump 24, so this can be driven off the back flat side of the belt.

It will be appreciated that any engine has to operate under a wide variety of different ambient conditions, and also that the engine includes a number of components of different materials having different rates of thermal expansion. It is important to ensure that the synchronization (time) between the crankshaft 10 and the camshaft 12 is accurately maintained under all conditions, and this requires the belt tension to be kept constant. It is also necessary to keep the belt tension constant in order to ensure optimum belt service life.

To keep the belt tension constant during engine operation, an auto tensioner unit 18 is provided. This unit has an idler pulley 26 which runs against the flat back surface of the belt and is mounted on a swing arm (not visible in the drawing). The mounting of the pulley on the swing arm is such that the arm is spring biased in an anti-clockwise direction (referred to the position shown in FIG. 1), and the spring biasing of the arm is selected so as to place a predetermined level of tension in belt 14. Pulley 26 can swing over a range indicated at 28, with the pulley being shown in the middle of this range.

When the engine is first built, it is important to set the belt so that the auto tensioner unit 18 is approximately in the middle of its possible range of movement. To do this an adjustable idler pulley 22 is provided. This idler pulley is shown in more detail in FIGS. 2 and 3 and comprises a pulley sleeve 30 mounted for free rotation on a hub 32. The sleeve 30 is toothed because, in the arrangement shown in the Figures, it engages with the toothed side of the belt 14. If the idler pulley was positioned in a different part of the belt run, the outer pulley sleeve 30 could be smooth. The sleeve 30 rotates relative to the hub 32 on bearings 34.

Figure 3:
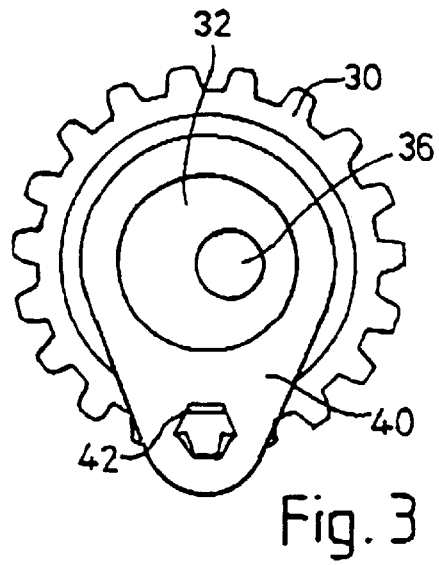
FIG. 3 is a plan view of the idler of FIG. 2.

As can be seen particularly in FIG. 3, the hub has an eccentric mounting hole 36 and to mount the pulley, a bolt will be passed through the hole 36 and into a tapped hole on the engine block 2. When the bolt is tightened, the inner surface 38 of the hub 32 will come into frictional contact with the surface of the block 2 so that the hub will be locked in position.

Figure 2:
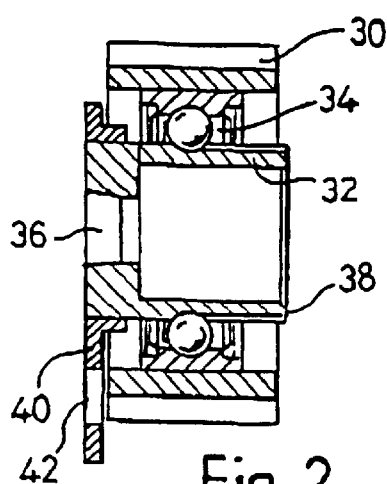
FIG. 2 is a cross section through an idler pulley in accordance with the invention.

Hub 32 also has a rotation lever 40 which, as can be seen in FIG. 2, is shrunk on to the outer periphery of the hub 32. The lever 40 has an actuation hole 42 into which an actuating tool can be placed.

In use, when the engine is being assembled, belt 14 will be placed around the appropriate pulleys. Auto tensioner unit 18 may be initially held out of the way so that it does not obstruct fitting of the belt. Pulley 22 will be secured by a bolt passed through the hole 36 but this bolt will not be tightened at this stage.

Auto tensioner 18 will then be released, so that pulley 26 moves under the influence of its spring loading against belt 14 to put the belt into tension. It is then the assembly operator's job to set the auto tensioner so that it is initially in the middle of its travel, enabling it to compensate for both the expansion and contraction of the belt and other engine components. To do this the operator places a tool in socket 42 and rotates hub 32 to vary the distance between the center of the bolt and thus the mounting axis of the hub 32 and the surface of the pulley sleeve 30 with which the belt 14 makes contact. Depending on the direction in which the lever 40 is turned, this will either increase or decrease the tension in the belt. When the auto tensioner idler pulley 26 is seen to be in its central position, then the bolt passing through the hole 36 is tightened to secure the axis of the pulley 22 permanently. The engine will then operate with the auto tensioner unit 18 maintaining the correct belt tension throughout the engine life.

Throughout the autotensioner setting operation, the camshaft pulley 20 is free to rotate on the camshaft 12 and the camshaft itself and the crankshaft 10 are held locked in their correct relative angular positions. Once the autotensioner has been set, the camshaft pulley is nonrotatably fixed or locked onto the camshaft 12 by tensioning a bolt 13 at the center of the pulley. This bolt pulls a tapered bore on the pulley onto a matching machined surface on the camshaft itself to lock the components together.

If the belt 14 has to be replaced at any stage, then the same procedure will be followed to set the position of the auto tensioner unit at the center of its range when the new belt is fitted.

Experience is shown that, surprisingly, very little effort is needed to rotate the lever 40, to put the necessary tension into the belt and to bring the auto tensioner into its middle position.

A further feature of the invention is that idler pulley 22 allows an engine built with slightly different components (for example a water pump with a different pulley) to still be part of the same belt drive arrangement because idler pulley 22 can be used to compensate for the different dimensions arising in the belt path.

FIGS. 4, 5 and 6 show four alternative ways of rotating the hub 32 of the idler pulley.

Figure 4A:
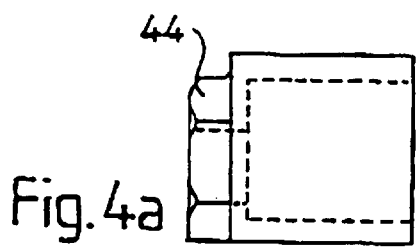
FIGS. 4a, 4b, 5a, 5b, 6a, 6b, and 7a, 7b are respectively side views and elevations of four alternative idler pulley constructions in accordance with the invention.
Figure 4B:
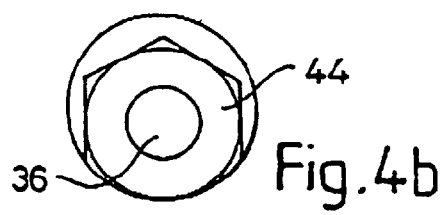

In FIGS. 4*a* and 4*b*, the top of the hub is formed with an eccentrically located hexagonal head (centered on the mounting hole 36) which can be engaged by a conventional hexagonal socket or spanner.

Figure 5A:
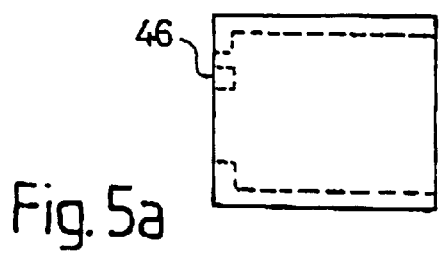
Figure 5B:
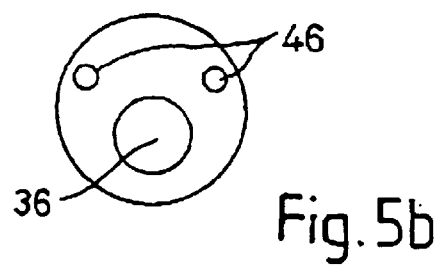

In FIGS. 5*a* and 5*b*, the hub has a flat top with two off center holes 46 into which a specially made tool can be inserted to rotate the hub.

Figure 6A:
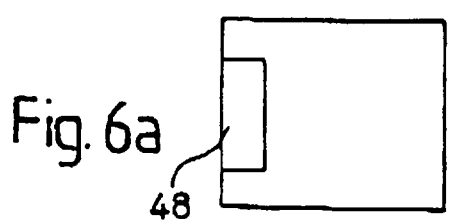
Figure 6B:
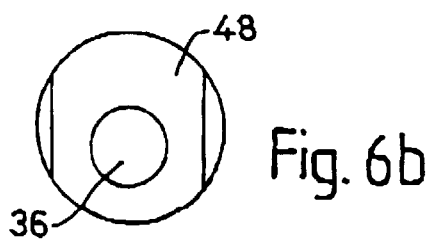

In FIGS. 6*a* and 6*b*, the head has a wide, parallel sided slot running across it into which a plain bar or a specially made tool can be inserted to rotate the hub.

Figure 7A:
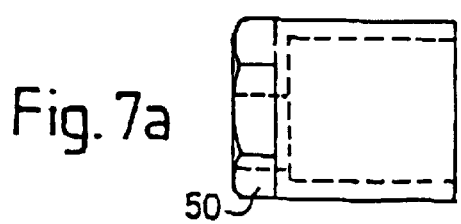
Figure 7B:
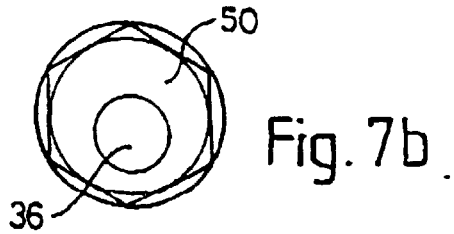

In FIGS. 7*a* and 7*b*, an arrangement is shown where a hexagonal head 50 is mounted on the hub centrally in relation to the hub, but eccentrically relative to the mounting hole 36.

Important features of the pulley construction are that whatever means are used for enabling the pulley to be rotated about the axis of the hole 36 should be low in height, and should allow good access to any tool designed to rotate the pulley about the eccentric axis.

While the invention has been shown and described in its preferred embodiments, it will be clear to those skilled in the arts to which it pertains that many changes and modifications may be made thereto without departing from the scope of the invention.

I claim:

1. A method of setting the tension in a drive belt forming part of a belt drive arrangement for operating accessories of an internal combustion engine, with said drive belt arrangement including a belt tensioner having a pulley and a separate idler pulley, said method comprising the steps of mounting the idler pulley to a fixed structure on a mounting axis which is eccentric to the rotation axis of the idler pulley, with the pulley lying in the belt path, releasing the mounting between the idler pulley and the fixed structure and then rotating the idler pulley about the mounting axis until the tension in the belt tensioner is at a desired level, securing the idler pulley in that position, and nonrotatably fixing a camshaft pulley to a camshaft after the tension in the belt tensioner is at said desired level.

* * * * *